(12) United States Patent
    Erwin et al.

(10) Patent No.: US 12,560,116 B2
(45) Date of Patent: Feb. 24, 2026

(54) VEHICLE-FLUIDS EXCHANGER

(71) Applicant: BG Intellectuals, Inc., Wichita, KS (US)

(72) Inventors: Michael Jason Erwin, Augusta, KS (US); Bradley Robert Young, Wichita, KS (US); Stephen Marvin Pederson, Wichita, KS (US); Zachary Adam Dold, Colwich, KS (US)

(73) Assignee: BG Intellectuals, Inc., Wichita, KS (US)

( * ) Notice: Subject to any disclaimer, the term of this patent is extended or adjusted under 35 U.S.C. 154(b) by 0 days.

(21) Appl. No.: 18/927,846

(22) Filed: Oct. 26, 2024

(65) Prior Publication Data

US 2025/0136066 A1 May 1, 2025

Related U.S. Application Data

(60) Provisional application No. 63/593,493, filed on Oct. 26, 2023.

(51) Int. Cl.
    F01P 11/02 (2006.01)
    B60S 5/00 (2006.01)
(52) U.S. Cl.
    CPC ............. F01P 11/0204 (2013.01); B60S 5/00 (2013.01)

(58) Field of Classification Search
    CPC ............. F01P 11/0204; F01P 11/0276; F01M 11/0458; B60S 5/00
    See application file for complete search history.

(56) References Cited

U.S. PATENT DOCUMENTS

2002/0166604 A1 * 11/2002 Camacho ................. F01P 11/06
                                                        141/98
2004/0084105 A1 * 5/2004 Awad ........................ F04F 1/02
                                                        141/59

* cited by examiner

*Primary Examiner* — Timothy P. Kelly
(74) *Attorney, Agent, or Firm* — Shook, Hardy & Bacon L.L.P.

(57) ABSTRACT

A fluid exchanger may exchange a fluid (e.g., coolant) in a reservoir (e.g., vehicle radiator) by removing or withdrawing a first fluid (e.g., old, spent, used, etc.) and by introducing a second fluid (e.g., new, clean, etc.). In some examples, the exchanger includes a valve construction that permits easy and safe transitioning from a first mode in which the fluid in the vehicle is run in a loop (e.g., after a cleaner is introduced) to a second mode in which the fluid is exchanged. In some examples, the exchanger includes a restrictor that stops fluid from flowing when the pressure fails to satisfy a threshold (e.g., where the pressure is below a threshold). In some examples, the exchanger includes a safety valve (e.g., ball valve) in the bottom of the new fluid tank, such that when the tank is empty, the valve will close and reduce the likelihood of unintentionally pushing air into the system (e.g., emptying the reservoir).

5 Claims, 10 Drawing Sheets

112

302

302

VEHICLE-FLUIDS EXCHANGER

CROSS REFERENCE TO RELATED APPLICATIONS

This application claims the priority benefit of U.S. Provisional Application No. 63/593,493 (filed Oct. 26, 2024), which is incorporated herein by reference in its entirety.

BACKGROUND

When servicing a vehicle, fluids (e.g., coolant) in a reservoir (e.g., radiator, storage tank, etc.) can be exchanged. For example, a first fluid (e.g., old, spent, used, etc.) can be removed or withdrawn, and a second fluid (e.g., new, clean, etc.) can be added. In some cases, a fluid exchanger may use a negative pressure, suction, or vacuum to draw the first fluid from the reservoir and/or may use positive pressure to push the first fluid from the reservoir. Subsequently, the second fluid may be transferred into the reservoir (e.g., via negative pressure held in the reservoir, a positive pressure applied to the second fluid, or a combination thereof).

DETAILED DESCRIPTION OF DRAWINGS

The present systems and methods for a vehicle-fluids exchanger are described in detail below with reference to these figures.

FIGS. 1A, 1B, and 1C depicts various views of a fluids exchanger.

DETAILED DESCRIPTION

This detailed description is related to a vehicle-fluids exchanger with one or more various improvements. In some examples, the exchanger includes a valve construction (e.g., mode-selection valve) that permits easy and safe transitioning from a first mode in which the fluid in the vehicle is run in a loop (e.g., after a cleaner is introduced) to a second mode in which the fluid is exchanged. In some examples, the exchanger includes a restrictor that stops fluid from flowing when the pressure fails to satisfy a threshold (e.g., where the pressure is below a threshold). In some examples, the exchanger includes a safety valve (e.g., ball valve) in the bottom of the new fluid tank, such that when the tank is empty, the valve will close and reduce the likelihood of unintentionally pushing air into the system (e.g., emptying the reservoir). In some instances, the exchanger can include any combination of the mode-selection valve, restrictor(s), and/or safety valve. In some cases, the exchanger can include the safety valve and restrictors without the mode-selection valve. These and other details are explained in more detail below.

Figures 1A, 1B:
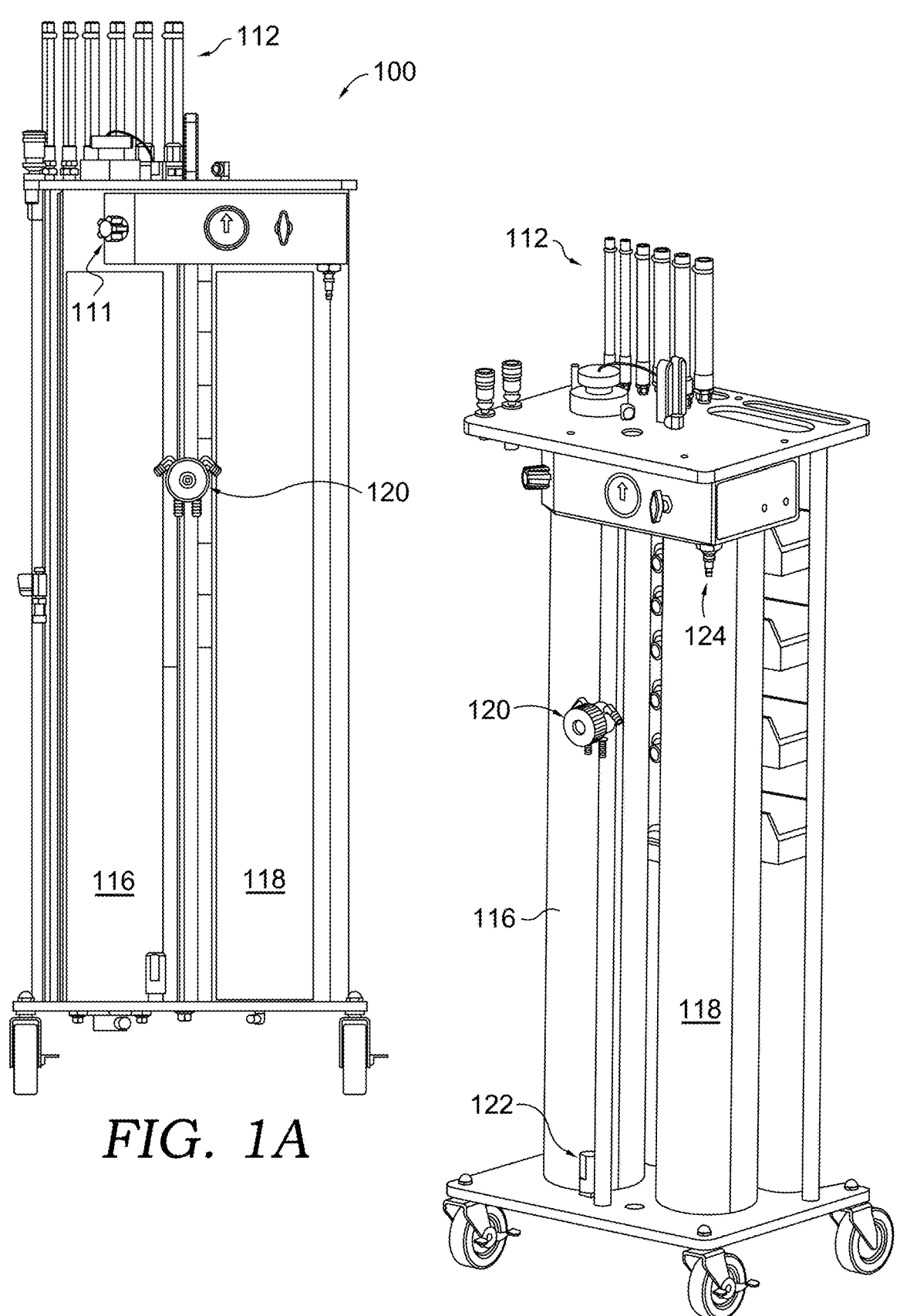
Figure 1C:
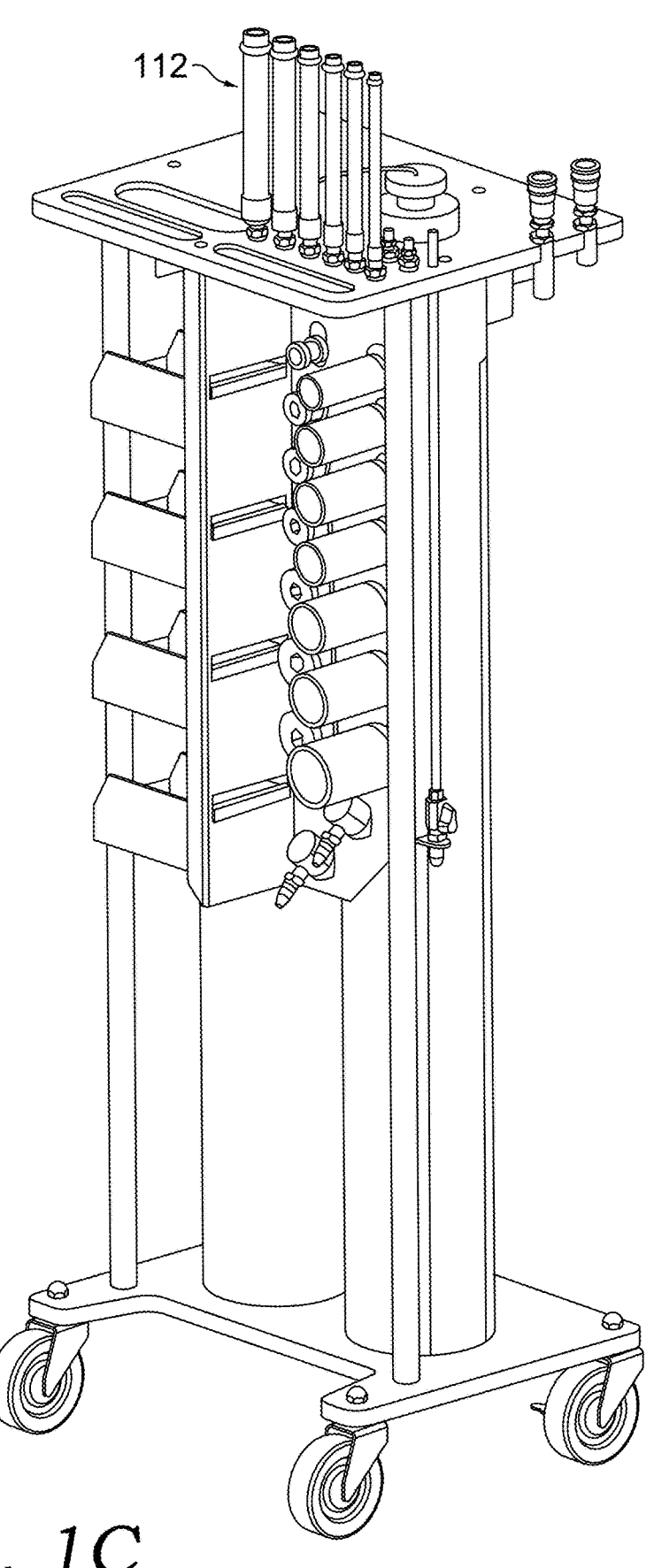

Referring to FIGS. 1A, 1B, and 1C, an example fluids exchanger 100 is depicted. In at least some examples, the fluids exchanger 100 operates by using incoming pressurized air to push and pull fluid from the vehicle to complete the fluid exchange service. Various sets of adaptors 112 allow the user to connect to the appropriate system (e.g., coolant system) through an active tank or upper radiator hose. Once connected, the machine pushes new coolant into the system using controlled pressure dictated by the operator.

In at least some examples, the fluids exchanger 100 includes an air-hose connector 124 for connecting to a pressurized air source (e.g., shop air or some other compressed air source). In addition, the fluids exchanger 100 can include additional tooling (not shown) for routing the compressed air to other portions of the fluids exchanger 100. For example, the fluids exchanger can include hoses or other conduit to route the compressed air to a pressure regulator (e.g., pressure regulator knob 111), to the new fluid tank 116 (e.g., to a port in the top of the new-fluid tank 116) and to a vacuum generator (e.g., that uses a venturi, air ejector, or other known mechanisms). In addition, the fluids exchanger 100 can include conduit or hose fluidly connecting the vacuum generator to the used-fluids tank 118. As such, in at least some examples, the pressurized air can be used to introduce a positive pressure to the new-fluid tank 116 and a negative pressure to the used-fluid tank 118. In some examples, the used-fluid tank 118 is not pressurized.

Vehicles can have differences (from one vehicle to the next) that dictate varied operational settings. In examples, a control panel allows the operator to set the service to what is appropriate for each particular service (e.g., pressure regulator knob 111). The clean fluid can be delivered from the new-fluid tank 116 to the vehicle (e.g., vehicle fluid reservoir, such as a radiator), which can push the old coolant (e.g., old, used, spent, etc.) out of the vehicle, into/through the connected used-fluid hose and to used fluid tank 118. In some examples, suction can be limited during the actual service so as not to risk pulling too much fluid out of the system. In some examples, vacuum can be generated in "Draw" stage for filling new fluid into the machine or pulling old fluid out of the car.

Stated another way, the new-fluid tank 116 stores new fluid for transmission to a vehicle. In addition, the new-fluid tank 116 is fluidly connected to the air-hose connector 124, which allows for positively pressurized air to pass to the new-fluid tank 116. In addition, the new-fluid tank comprises a first port (e.g., near the bottom) through which the new fluid passes from the new-fluid tank when distributed to the vehicle. That is, a hose (e.g., first hose) can be connected to the first port to carry the new fluid to the vehicle. In addition, the used-fluid tank 118 is configured to receive used fluid from the vehicle, and the used-fluid tank 118 can be fluidly connected to the air-hose connector 124 (e.g., indirectly, such as where a vacuum generator is positioned along the fluid path between the air-hose connector 124 and the used-fluid tank 118). The used-fluid tank 118 can include a second port (e.g., near the bottom) through which used fluid is received from the vehicle and into the used-fluid tank. For example, a hose (e.g., second hose) can fluidly connect the second port to the vehicle and allow the used fluid to be pulled from the vehicle, through the hose and into the used-fluid tank. In examples, when the first hose and the second hose are connected to the vehicle, then a closed loop is formed between the first port and the second port.

Figure 2A:
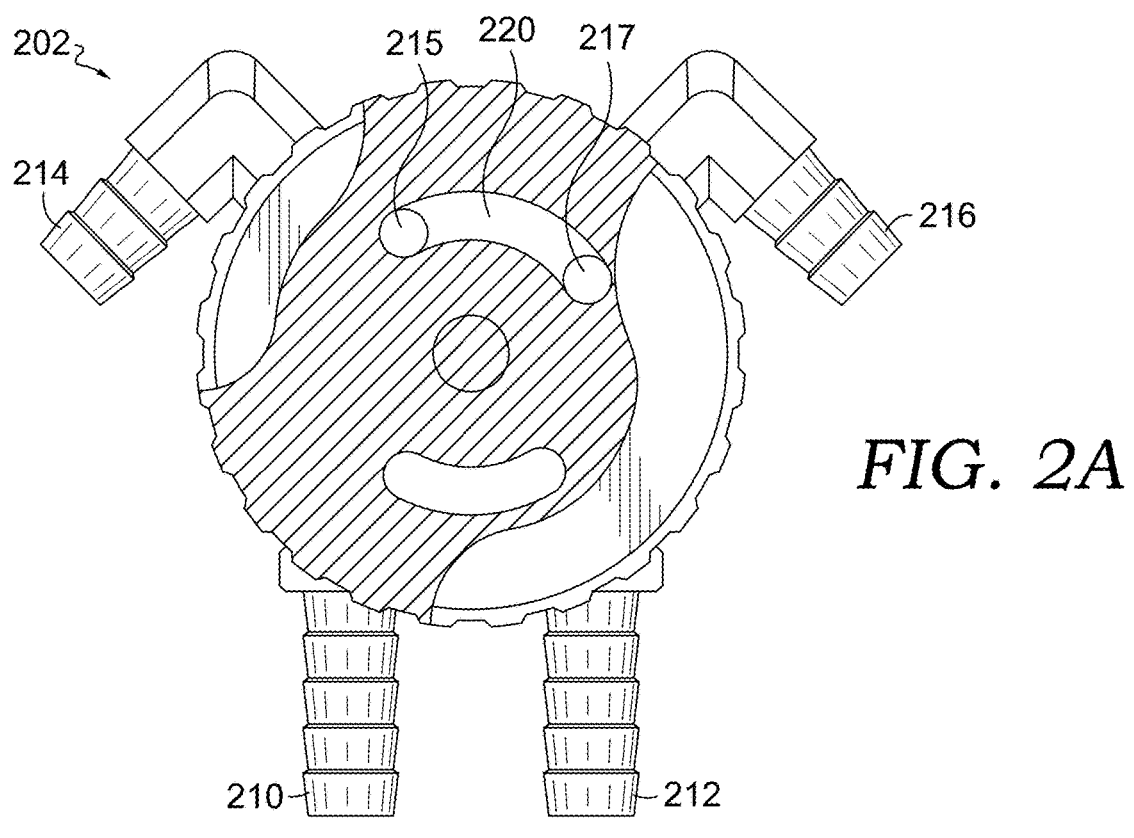
FIGS. 2A and 2B depict an example of a valve.
Figure 2B:
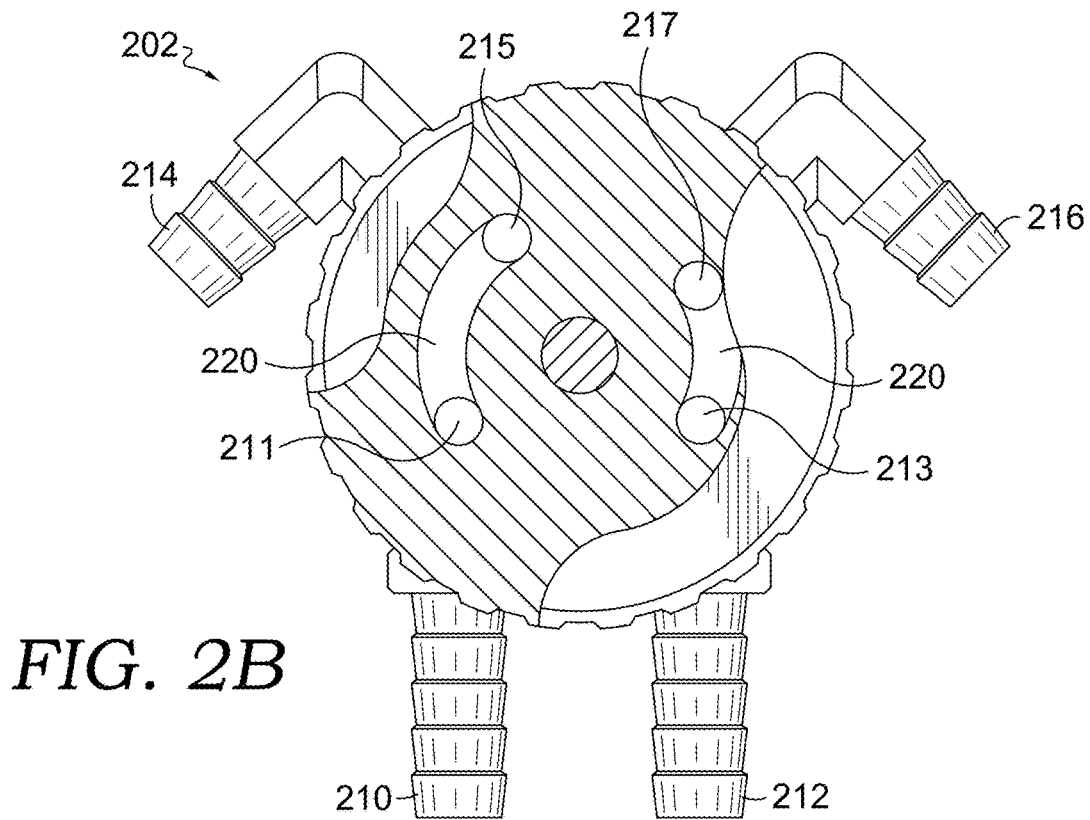

In examples of the present disclosure, the fluid circuit for the vehicle can be run back to itself in a loop. For example, a coolant system cleaner can be used prior to exchanging the fluid to prepare the system prior to service. In examples of the present disclosure, the exchanger includes a bypass valve 120, which allows for at least a "bypass mode" and a "service mode." An example of a bypass valve 202 is shown in FIGS. 2A and 2B. Another example of a bypass valve 302 is shown in FIGS. 3A-3E.

Bypass Valve—FIGS. 2A and 2B

In examples, the bypass valve 202 can include a first port 210 (FIGS. 2A and 2B) for connecting (via a hose not shown) to the new-fluid tank 116; a second port 212 for connecting (via a hose not shown) to the used-fluid tank 118; a vehicle-in port 214 for connecting (via a hose not shown) to the reservoir (or other portion of the vehicle); and a vehicle-out port 216 for connecting (via hose not shown) to another portion of the reservoir or vehicle.

As shown in FIG. 2A, the valve 202 can be set to "bypass" configuration in which the ports 214 and 216 are in direct fluid communication with one another and do not communicate with the ports 210 and 212. That is, reference numerals 215 and 217 depict openings in fluid commination with the ports 214 and 216, respectively, and the curved slot 220 fluidly connects the openings 215 and 217. As such, the flow is run to the machine and back (e.g., when a cleaner has been introduced to the reservoir). After a period of running, when the operator wishes to exchange the fluid, the valve 202 can be moved to the "service" position, which is shown in FIG. 2B. For example, a handle or other knob can be used to turn the slots relative to the openings. In the service position, the port 210 communicates directly with the port 214 to flow new fluid to the vehicle, and the port 216 communicates directly with the port 212 to flow used fluid to the used fluid tank. That is, reference numerals 211 and 213 depict openings in fluid commination with the ports 210 and 212, respectively, and the curved slot 220 fluidly connects the openings 215 and 211, while the curved slot 222 fluidly connects openings 213 and 217.

The valve 202 offers various advantages. For example, when the coolant is in the loop back to the vehicle, the coolant can heat up making the attached fittings very hot and difficult to handle. The valve 202 can allow the machine to switch from "bypass" mode to "service" mode without having to handle or move these hoses. This valve also acts differently than other 4-way double L valves in that it disconnects the tanks in "Bypass" rather than allowing them to flow back and forth.

Bypass Valve—FIGS. 3A to 3E

Figures 3A, 3B:
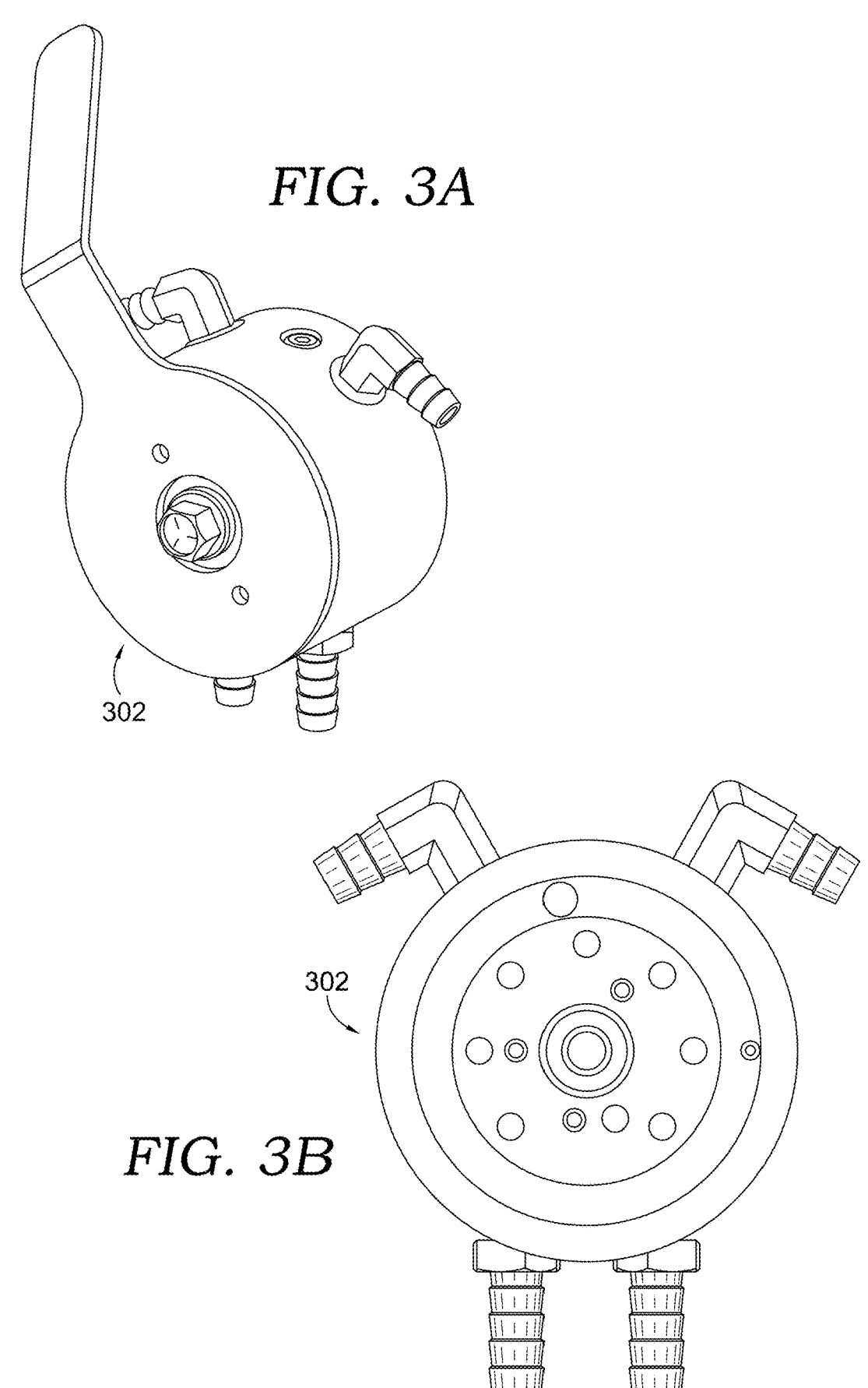
FIGS. 3A through 3E depict an example of another valve.
Figure 3C:
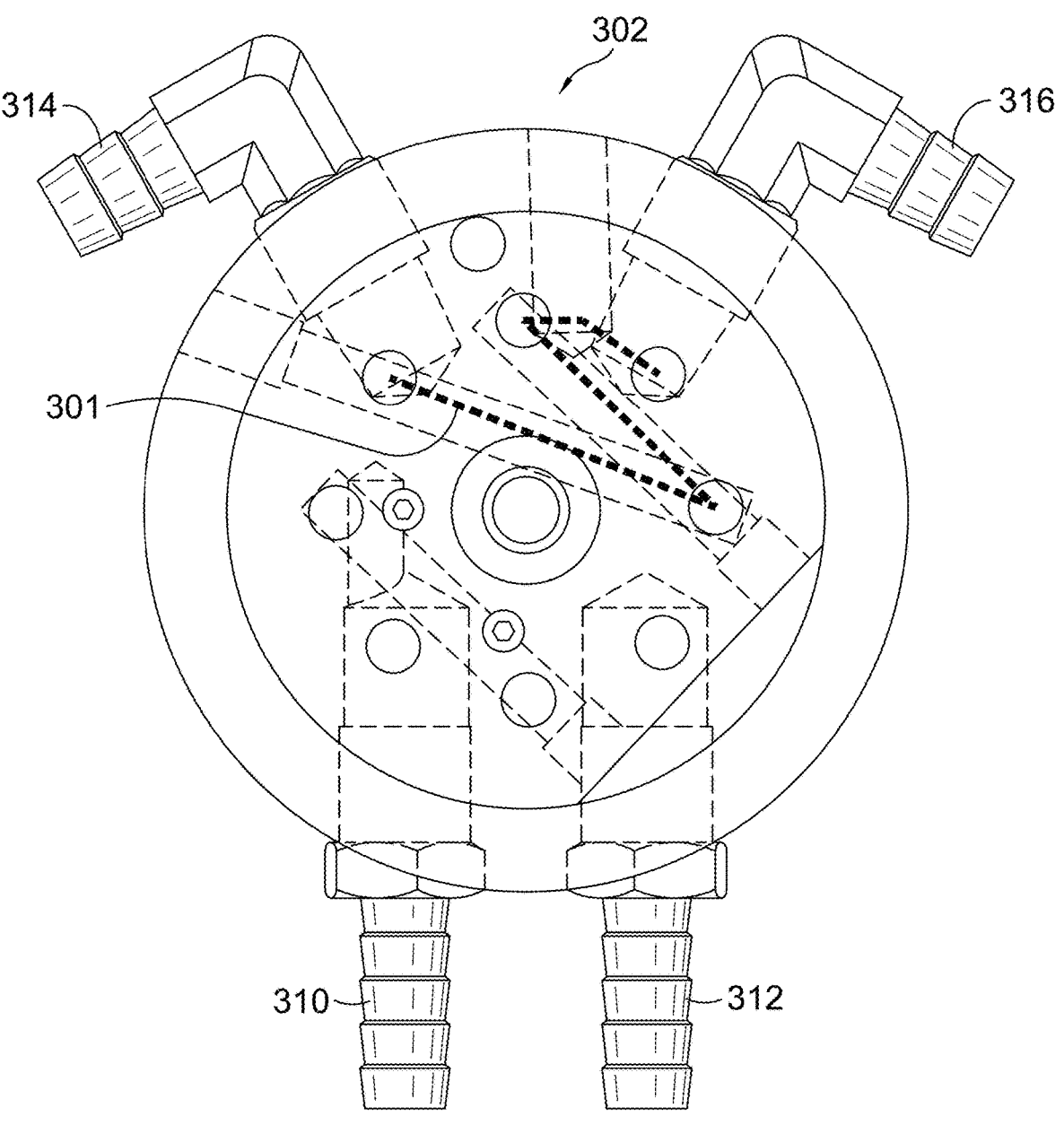
Figure 3D:
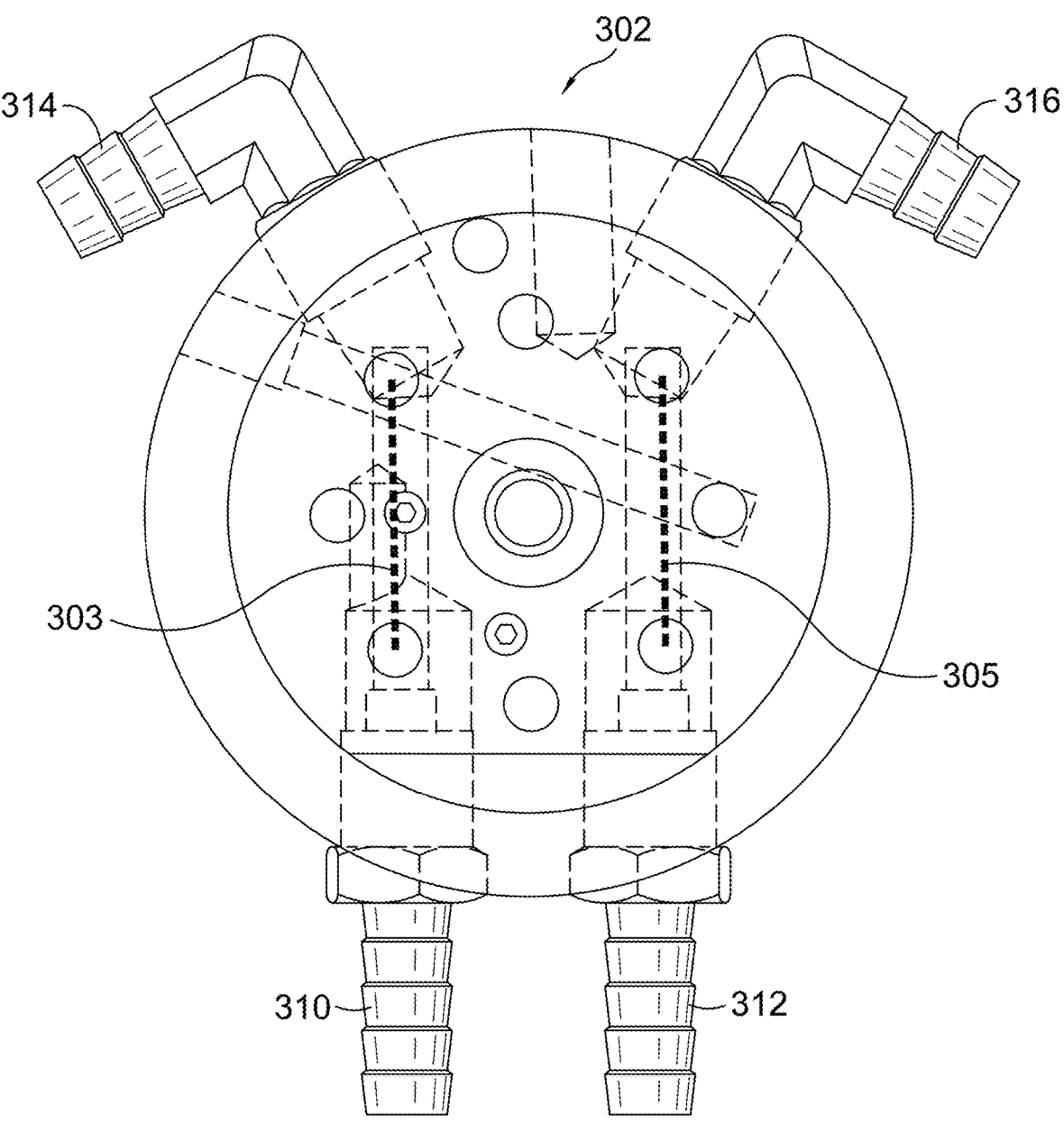
Figure 3E:
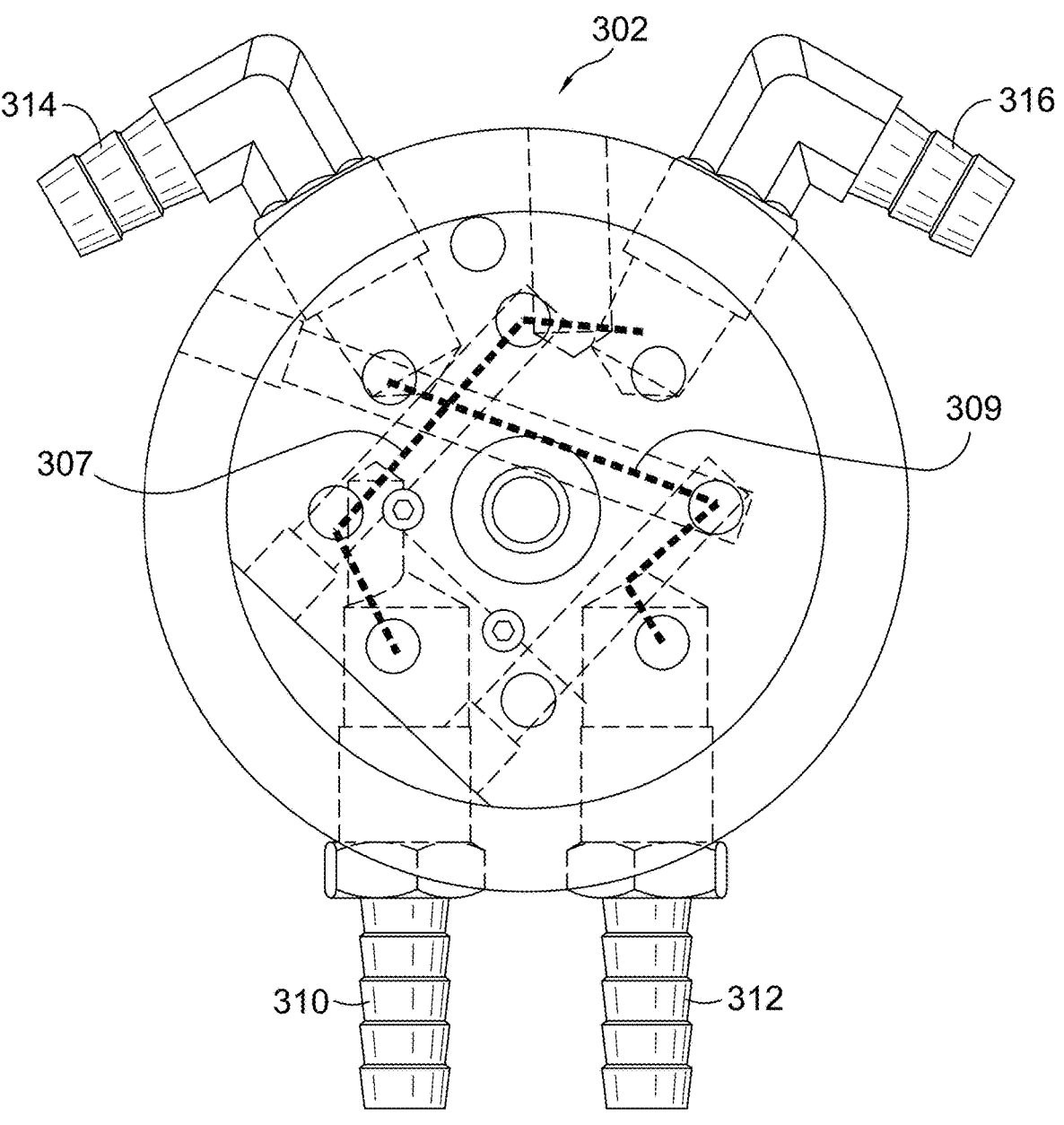

In examples (FIGS. 3A to 3E), the bypass valve 302 can include a first port 310 for connecting (via a hose not shown) to the new-fluid tank 116, a second port 312 for connecting (via a hose not shown) to the used-fluid tank 118, a vehicle-in port 314 for connecting (via a hose not shown) to the reservoir (or other portion of the vehicle), and a vehicle-out port 316 for connecting (via hose not shown) to another portion of the reservoir or vehicle. In FIGS. 3C, 3D, and 3E, the dash lines represent cavities, voids, bores and/or channels within the valve housing. In addition, the valve 302 can include a handle (as shown) for rotating the cavities, voids, bores and/or channels within the valve housing to change the alignment with the ports.

In examples, the valve 302 can include at least three different modes or position. In FIG. 3C, the valve 302 can include a bypass mode in which the ports 314 and 316 are in direct fluid communication with one another and do not communicate with the ports 310 and 312. The line or path of fluid communication is indicated by the heavier weighted dash line 301.

In FIG. 3D, the valve 302 can include a first service mode in which the port 310 communicates directly with the port 314 to flow new fluid to the vehicle, and the port 316 communicates directly with the port 312 to flow used fluid to the used-fluid tank. The line or paths of fluid communication are indicated by the heavier weighted dash lines 303 and 305.

In FIG. 3E, the valve 302 can include a second service mode that can still be operational, even if the valve 302 has been hooked up incorrectly to the vehicle (e.g., the port 316 is hooked up as the vehicle-in port and the port 314 is hooked up as the vehicle-out port). In the second service mode, the port 310 communicates directly with the port 316 to flow new fluid to the vehicle, and the port 314 communicates directly with the port 312 to flow used fluid to the used-fluid tank. The line or paths of fluid communication are indicated by the heavier weighted dash lines 307 and 309.

The valve 302 offers similar advantages to the valve 202.

Flow Restrictor

In examples flow can also be controlled with various types of restrictors (e.g., 122 in FIG. 1B). For example, without a flow restrictor (e.g., between the new-fluid tank and the vehicle) new fluid could inadvertently flow from the new-fluid tank to the vehicle based on gravity. That is, when the new fluid tank includes fluid (e.g., when filled an prior to a service or after a service) an amount of head pressure can exist that could inadvertently push the fluid into the hose and subsequently into the vehicle (in a manner not intended or inconsistent with the servicing). As such, examples of the present disclosure can include a flow restrictor that is configured to restrict flow unless a minimum pressure threshold is reached, such as when the system is pressurized from an external air source (e.g., either pressure or vacuum).

Figure 4:
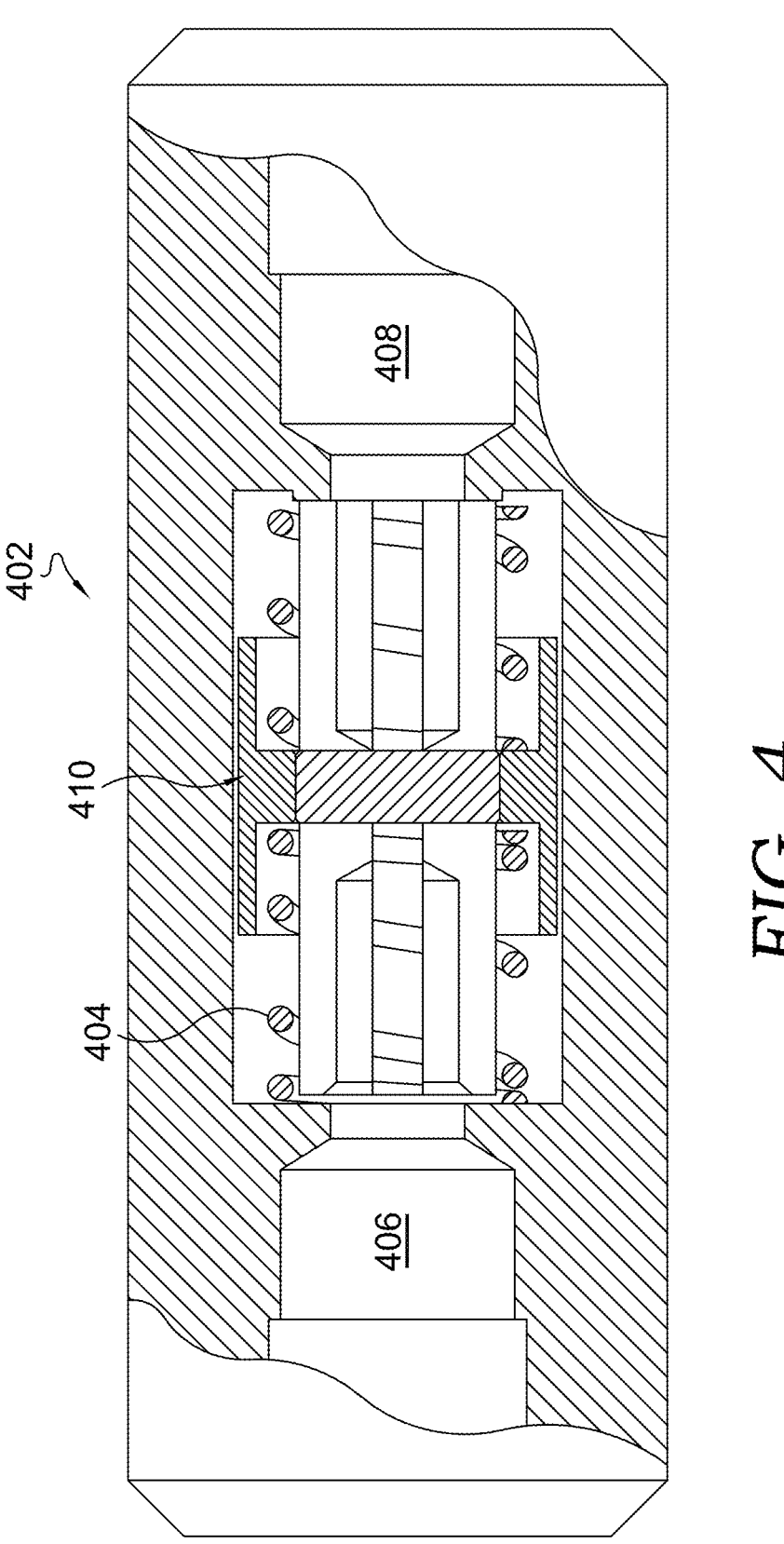
FIG. 4 depicts an example of a flow restrictor.
Figure 5:
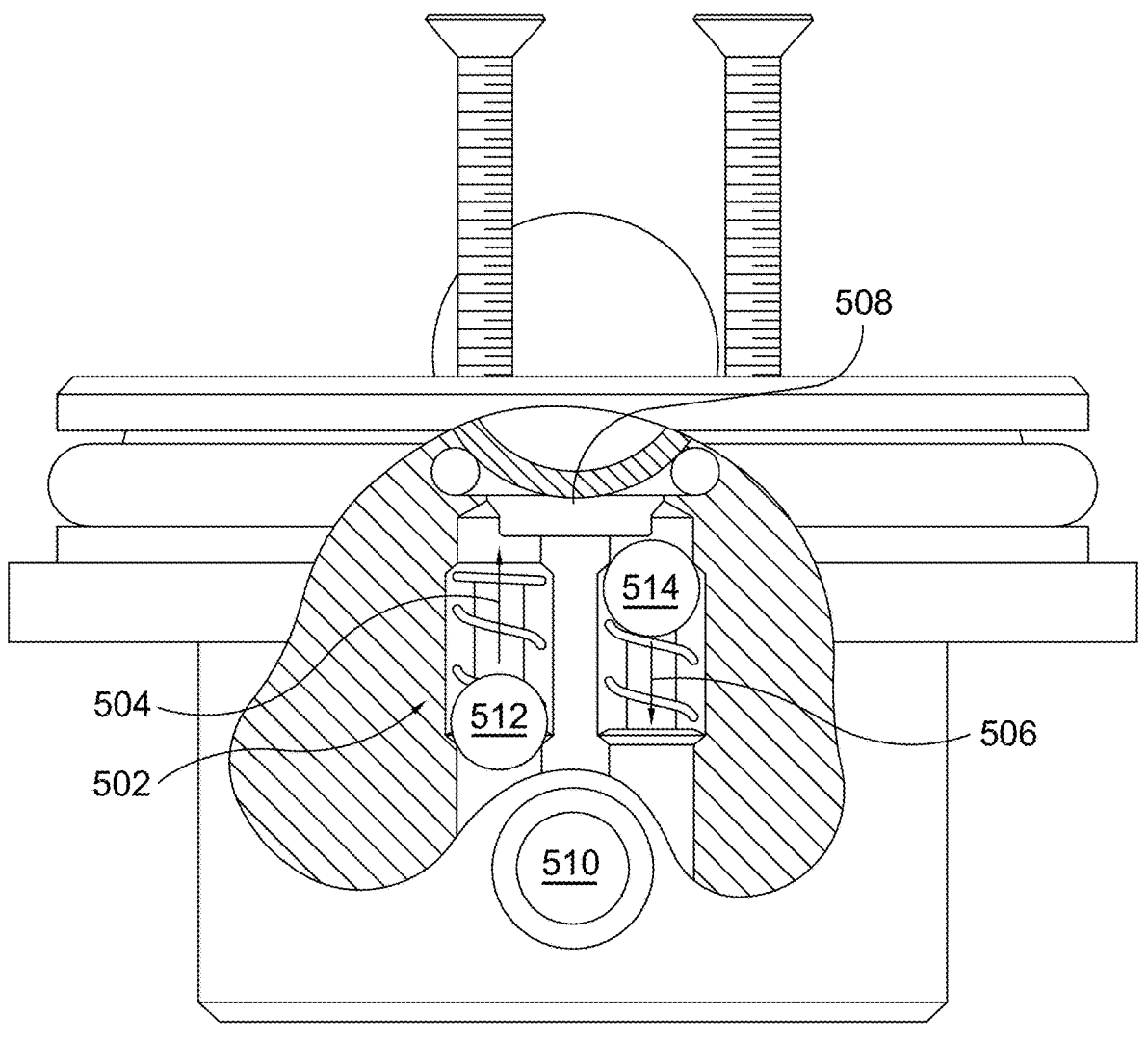
FIG. 5 depicts an example of another flow restrictor.

A first type of flow restrictor 402 is illustrated in FIG. 4, and a second type of flow restrictor 502 is illustrated in FIG. 5.

In an example, referring to FIG. 4, a restrictor 402 can include a bi-directional flow restrictor. The restrictor 402 can be set to a first pressure (e.g., by selecting an appropriately tuned spring 404) that is greater a second pressure created by a full tank of coolant (e.g., around 2 psi or between 2 psi and 4 psi). The second pressure can be based on a head pressure associated with the tanks (e.g., the new-fluid tank) when the tank is filled to at least a threshold level, which can be at least 80% in some examples, or at least 90% in some examples. In some examples, the restrictor includes a pressure rating and/or the spring include a spring rate that is equal to or greater than 2 psi, or in some examples, between 2 psi and 4 psi. In some cases, the pressure rating and/or the spring rate can be less than 2 psi or more than 4 psi. This restrictor 402 stops the tanks from sending fluid to the vehicle or to each other by their own weight and momentum. The restrictor 402 would allow flow either direction in the hose (either under positive pressure as a "push" or a negative/vacuum pressure as a "pull") as long as the pressure is above the set point which should only be created when the machine is under intentional operation. In examples, the restrictor 402 can reduce risk of error due to the operator not following proper procedure.

More specifically, the flow restrictor 402 can include a first port 406 (e.g., that is fluidly coupled to the new fluid tank) and a second port 408 (e.g., that is coupled to the new-fluid hose going to the vehicle). In addition, the flow restrictor 402 can include a sliding shuttle 410 that is positioned between the first port 406 and the second port 408 and that can be biased (with the spring(s) 404) to a blocking position. The spring(s) 404 can be set to a pressure that is slightly above a head pressure when the new-fluid tank is full, such that the shuttle 410 will be in a blocking position when the system is depressurized. As indicate above, the spring(s) 404 can include a spring rate (or the restrictor 402 can otherwise include a pressure rating) that is based on the new-fluid tank being at least 80% full, and in some cases, at least 90% full. In some examples, the spring rate or the pressure rating is about 2 psi or between 2 psi and 4 psi. In some cases, the pressure rating and/or the spring rate can be less than 2 psi or more than 4 psi. In examples, once the fluid is pressurized (e.g., positive or negative/vacuum), then the pressurized fluid can overcome the spring bias against the shuttle 410, move the shuttle from the blocking position, and pass through the restrictor 402.

In an example, referring to FIG. 5, a restrictor 502 can include a dual direction check valve. In examples, the restrictor can be positioned between a first port 508 (e.g., in fluid communication with the new-fluid tank) and a second port 510 in fluid communication with the new-fluid hose. That is, the first port 508 can be associated with an opening in a bottom portion of the new-fluid tank. In some examples, the second port 510 can include a bib or other connector for a hose or similar fluid conduit. The restrictor 502 can be configured, such that the parallel check valves remain open when pressure is above a pressure (e.g., 2 to 4 psi). Absent this minimal pressure, the valves can seat and close the line. That is, fluid can flow in either direction (arrows 504 and 506), as long as the pressure (or vacuum) overcomes a threshold pressure.

In at least some examples, each parallel check valve includes a spring 512 and 514 (or other ratable biasing element) that can be set to include some minimum pressure (e.g., 2 to 4 psi), which must be overcome in order to fluid to flow from one port to the other (in a direction of the arrow 504 or 506). Absent that minimum pressure (e.g., as created by the positive or negative pressure on the system, such as from the shop air or other compressed air source), the springs 504 and 506 can bias the blocking element 512 and 514 (e.g., balls), respectively to a seated/blocking position. In examples, spring(s) 512 and 514 can be set to a pressure that is slightly above a head pressure when the tanks are full, such that the blocking elements 512 and 514 will be in a blocking position when the system is depressurized. As indicate above, the spring(s) 512 and 514 can include a spring rate (or the restrictor 502 can otherwise include a pressure rating) that is based on the tanks being at least 80% full, and in some cases, at least 90% full. In some examples, the spring rate or the pressure rating is about 2 psi or between 2 psi and 4 psi. In some cases, the pressure rating and/or the spring rate can be less than 2 psi or more than 4 psi.

In at least some examples, when the new-fluid hose and the used-fluid hose are both coupled to the vehicle (e.g., as part of the servicing process), then a closed loop is formed, and a check valve or flow restrictor can be positioned at a variety of positions along that closed loop, between the new-fluid tank and the used-fluid tank.

Tank Check Valve

Figure 6A:
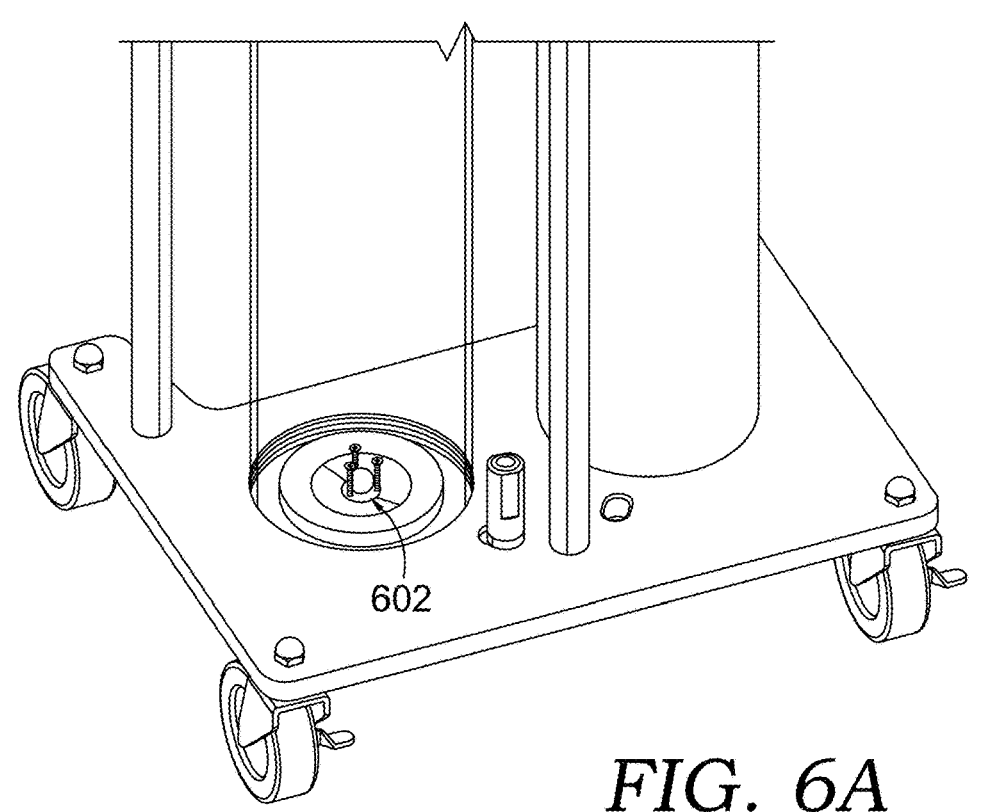
FIGS. 6A and 6B depicts an example of a ball check valve.
Figure 6B:
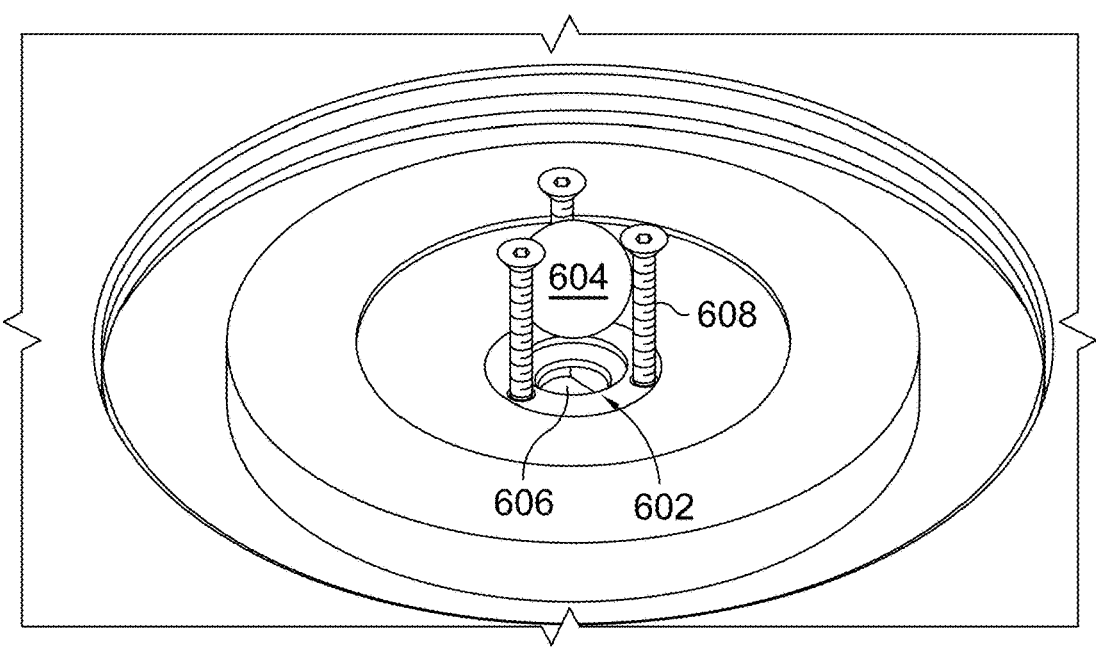

In at least some examples, a tank (e.g., new fluid tank) can include a ball check valve. For example, FIG. 6A and FIG. 6B illustrates a ball check system 602 that can be positioned in a bottom of the new fluid tank 116. As described above, during service the incoming fluid delivered from the new-fluid tank 116 and its hose pushes the old coolant out of the vehicle into the connected used-fluid tank 118. In examples, there might be limited to no suction on the used-fluid tank during the actual service so as not to risk pulling too much fluid out of the system. The ball check system 602 can be positioned in the bottom of the new-fluid tank 116, and the ball 604 will seat and shut off flow once the tank 116 empty. As shown in FIG. 6B, the ball 604 is not seated and the tank is not sealed at opening 606. In examples, the opening 606 can be a mouth to a port in the bottom of the tank (which could correspond with the port 508 or be in fluid communication therewith), and the opening 606 can include a width that is smaller than a width of the ball 604. In FIG. 6B, the ball 604 is illustrated spaced apart from the opening 606 and not seated, such as when there is enough new fluid in the tank to float the ball 604. In examples, the stops 608 can prevent the ball 604 from floating out of position (e.g., when the tank is filled with fluid) and can help to keep the ball 604 aligned with the opening 606. In examples, once the fluid in the tank is below a minimum threshold that is necessary to float the ball 604 apart from the opening 606, the ball 604 can drop and seat into the opening 606 to shut-off the fluid connection. The automated shut-off afforded by the ball check system 602 effectively ends the service automatically. The feature can reduce the likelihood of air being introduced into the system and/or the vehicle being run dry (e.g., where fluid is pulled from the vehicle without pushing new fluid back in).

In at least some examples, a fluid exchanger of the present disclosure can include the ball check system 602 without the restrictor 502. In some examples, a fluid exchanger of the present disclosure can include the ball check system 602 with the restrictor 502. In some examples, a fluid exchanger of the present disclosure can include the ball check system 602 with a single check valve. In some examples, a fluid exchanger of the present disclosure can include one or more check valves (e.g., in 502) without the ball check system 602.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

This detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

The invention claimed is:

1. A fluid exchanger for exchanging fluids in a vehicle, the fluid exchanger comprising:

an air-hose connector for connecting to a pressurized air source;

a new-fluid tank that stores new fluid for transmission to a vehicle and that is fluidly connected to the air-hose connector, wherein the new-fluid tank comprises a first port through which the new fluid passes from the new-fluid tank when distributed to the vehicle;

a used-fluid tank that is configured to receive used fluid from the vehicle and that is fluidly connected to the air-hose connector, wherein the used-fluid tank comprises a second port through which used fluid is received from the vehicle and into the used-fluid tank; and a check valve positioned between the first port and the second port, wherein the check valve comprises a first check valve and a second check valve that is in a parallel relationship with the first check valve.

2. The fluid exchanger of claim 1, wherein the check valve is arranged between the first port and a hose that carries new fluid from the new-fluid tank and to the vehicle.

3. The fluid exchanger of claim 1, wherein:

the fluid exchanger comprises a first hose that is fluidly connected to the first port and that is connectable to the vehicle; the fluid exchanger comprises a second hose that is fluidly connected to the second port and that is connectable to the vehicle;

when the first hose and the second hose are connected to the vehicle, then a closed loop is formed between the first port and the second port; and the check valve is positioned along the closed loop.

4. The fluid exchanger of claim 1, wherein the check valve comprises a pressure rating equal to or greater than a head pressure of the new-fluid tank when the new-fluid tank is at least 80% full.

5. The fluid exchanger of claim 1, wherein the check valve comprises a pressure rating that is in a range of 2 psi to 4 psi.

\* \* \* \* \*